PULSE RISE TIME ENHANCING SATURABLE REACTOR
Filed June 29, 1964
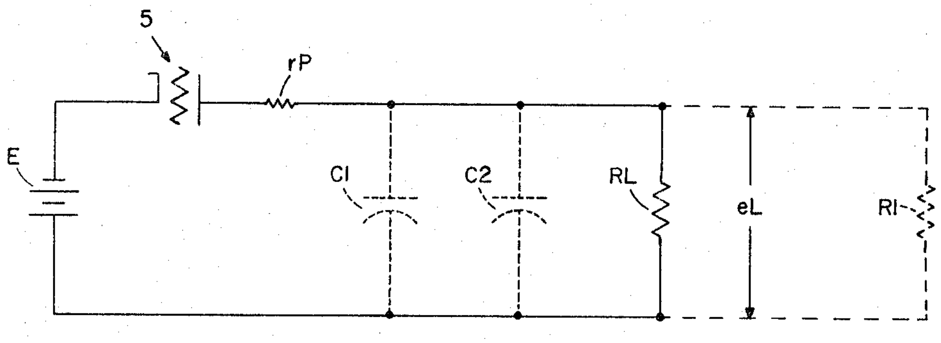
FIG. 1 *PRIOR ART*
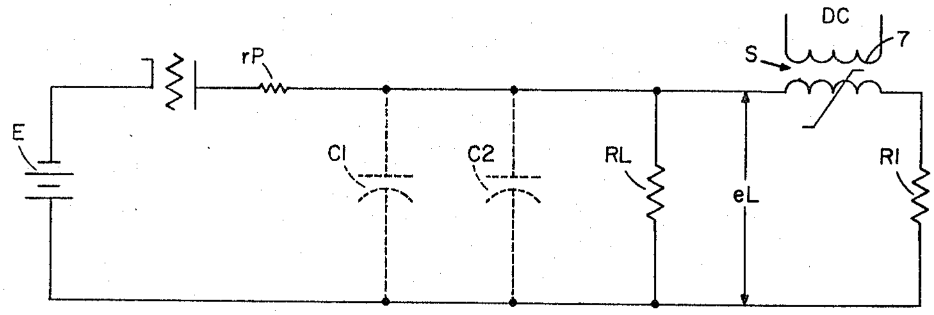
FIG. 2
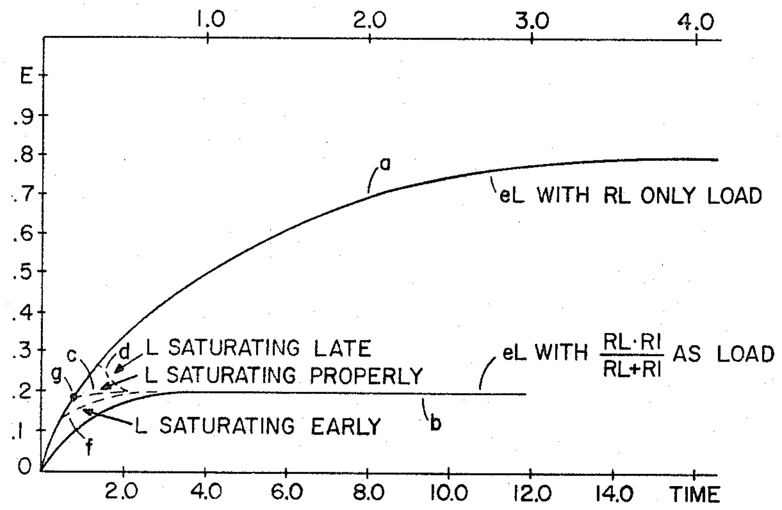
FIG. 3
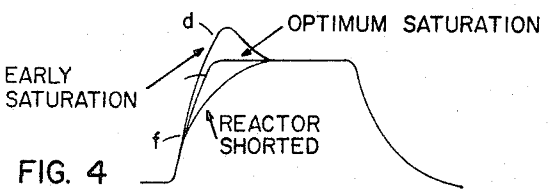
FIG. 4
Willard W. McLeod, Jr.
John R. Caswell,
INVENTORS.
Harry M. Saragovitz
BY Edward J. Kelly
Herbert Berl
Jack W. Voigt United States Patent Office 3,381,139
Patented Apr. 30, 1968

3,381,139
PULSE RISE TIME ENHANCING SATURABLE REACTOR

Willard W. McLeod, Jr., Lexington, and John R. Caswell, Lincoln, Mass., assignors, by mesne assignments, to the United States of America as represented by the Secretary of the Army Filed June 29, 1964, Ser. No. 379,059
6 Claims. (Cl. 307—106)

ABSTRACT OF THE DISCLOSURE

A device for determining pulse rise time and voltage across a load utilizing a saturable reactor to selectively parallel a resistance across the load.

This invention relates to the application of a saturable reactor and a resistor to a pulse modulator for the purpose of enhancing or decreasing the rise time of a pulse applied to a real load.

Transmitted waveforms of current and projected radar technology require pulse generators of increasingly greater precision. In radar transmitter modulator circuits it is often required that the pulse rise time across the load be of the order of nanoseconds. Practical loads such as magnetrons, TWT's, amplitrons, and klystrons present finite capacity in shunt with the load along with the stray capacity of the circuit. The turn on pulse may be applied to the cathode or emitter end of the load (beam pulsing) or may be applied to a control element in the load to accomplish activation of the device.

The modulator circuits to which this invention is applicable are the hard tube circuits, which are of reasonably high power capability. In these circuits a number of stages are required to develop the output pulse and each stage adds degradation to the achievable output pulse rise time.

The various features of novelty which characterize this invention are pointed out with particularity in the claims annexed to and forming a part of this specification. A better understanding of the advantages, specific objects obtained with use of, and many of the attendant advantages of this invention will be readily appreciated as the same becomes better understood by reference to the following detailed description when considered in connection with the accompanying drawing in which like reference numerals designate like parts throughout the figures thereof and wherein:

FIGURE 1 is a schematic diagram illustrating the prior art;

FIGURE 2 is a schematic diagram illustrating a preferred form of the present invention; and FIGURES 3 and 4 are waveforms of signals applied to and derived from the circuits of FIGURES 1 and 2.

In order to better understand the operation of the system described in the figures, a description of their components referred to is first presented. In FIGURES 1 and 2 like reference notations designate like components. Tube 5 is a triode or a transistor which is connected to a source of power E and receives at its grid a turn on pulse. Power source E may be a battery, generator or any conventional source of power. Resistor *rp* represents the resistance of tube 5 and the resistance in the line between the source E and the load RL. The load RL is a magnetron, TWT, amplitron, klystron, or the like. Capacitors C1 and C2 are the capacity presented by the load and the stray capacity of the circuit panorama. R1 is a resistive load used to shunt the real load. A saturable reactor S of the self-saturating square hysteresis type is connected between the source and the resistor R1. A reset winding 7 is provided for the saturable reactor S.

The time constant of the circuit of FIGURES 1 and 2 without the resistor R1 is $$t_o = \frac{rp \cdot RL}{rp + RL}(C1 + C2) \qquad (1)$$

wherein:

$t_o$=the time constant
$rp$=the resistance of component $rp$
$RL$=the resistance of the load
$C1$=the capacitance of capacitor C1
$C2$=the capacitance of capacitor C2

The time rise of such a circuit is $$t_r = 5t_o \qquad (2)$$

for 0–99% rise wherein: $t_r$=the time rise.

In order to achieve fast rise times the usual procedure is to shunt the load RL with a resistive load R1 such that $$t_r = \frac{5\ (rp \cdot RL \cdot R1)}{(rp \cdot RL + RL \cdot R1 + R1 rp}(C1 + C2) \qquad (3)$$

This has two effects as may be seen in curves of FIGURE 3. Curve *a* is the voltage (*e*L) across the load RL without resistor R1 connected in shunt therewith. Curve *b* is *e*L with the resistor R1 connected in the circuit. With the resistor R1 in the circuit the current required from the source is increased, and the source voltage E required to produce a given load voltage *e*L is increased, because of the voltage divider action of the tube and $$\frac{RL \cdot R1}{RL + R1}$$

The object of the invention is to use the first part of curve (*a*) and the latter part of curve (*b*) so as to get a better waveform *c*. This is done by providing a switching means such as a saturable reactor S between the resistor R1 and the load. Saturable reactor S will automatically saturate at point *g* on curve *a* due to its selected properties or due to the setting of reset winding 7. Curves *d* and *f* show the waveforms when the reactor saturates late and early respectively.

In the circuit of FIGURE 2 initially reactor S is unsaturated and so is a relative high inductance which effectively isolates R1 from the source E. The ratio of the tube impedance to RL is quite small so that at $t=\infty$, *e*L would reach a value close to that of E. The rise will therefore be that described by Equation 1. In this case *e*L will be referred to as *e*RL.

When reactor S saturates and becomes a low inductance, R1 is effectively shunted across the load RL. The maximum voltage of *e*L is now limited by the ratio of the tube impedance *rp* and the new load, provided the grid drive to the tube 5 remains unchanged. This *e*L is appreciably lower than with RL alone as a load, and will be referred to as *e*R1. In this invention reactor S does not saturate until this latter value of *e*L max. is reached (point *g* on curve *a*). Therefore the rise time of *e*R1 follows the curve of *a* until the reactor saturates. At time *e*R is at its steady state value, and no further change in valve of *e*R1 takes place. The result is a sharp corner at the top of the pulse rather than the usual rounded one. FIGURES 3 and 4 show the results graphically.

Saturable reactor S is so selected that it will saturate at the proper time. A reset winding 7 may be provided to place the reactor in the proper flux state after each pulse has fired.

It should be noted that this invention is primarily applicable to hard tube modulators for one of its advantages is that its application allows utilization of the max-current available from the switch tube 5 for capacitor charging and at the same time it places a load on the tube at the proper time to guarantee that the tube operation will not move into the high grid dissipation region.

While the invention has been described with reference to a preferred embodiment thereof, it will be apparent that various modifications and other embodiments thereof will occur to those skilled in the art within the scope of the invention. Accordingly, we desire the scope of our invention to be limited only by the appended claims.

We claim:

1. An electrical circuit comprising a source of D.C. voltage; a triode having a control element, a cathode, and an anode; a source of pulses connected to said control element; a load connected in series with said source of D.C. voltage, said anode and said cathode; said series circuit presenting finite capacity in shunt with said load; a resistor means; and switching means connecting said resistor means in shunt with said load.

2. An electrical circuit as set for in claim 1, wherein said triode has an impedance of such a value that when the resistance means is connected in shunt with said load, the voltage drop thereacross is of appreciable value with respect to load voltage, and the voltage drop across the triode is of negligible value with respect to the voltage across the load when the resistor means is not effectively connected to the load.

3. An electrical circuit as set forth in claim 2, wherein said switching means is a saturable reactor.

4. An electrical circuit as set forth in claim 3, wherein said saturable reactor saturates only at the time the voltage across the load is at a maximum value of voltage possible with the resistor means presented to the D.C. source.

5. An electrical circuit as set forth in claim 4, wherein said load contains finite capacity which decreases rise time of a pulse from said source of pulses.

6. An electrical circuit as set forth in claim 5, wherein said saturable reactor has a reset winding.

References Cited

UNITED STATES PATENTS

| | | | |
|---|---|---|---|
| 2,412,893 | 12/1946 | Lee | 307—108 XR |
| 2,803,759 | 8/1957 | Kreuder | 307—106 |
| 2,909,681 | 10/1959 | Schlemm | 307—106 |
| 2,912,607 | 11/1959 | Bownik | 307—106 |
| 2,919,414 | 12/1959 | Neitzert | 331—87 |
| 3,081,409 | 3/1963 | Adelaar | 307—108 |
| 3,161,783 | 12/1964 | Irmisch | 307—106 |
| 3,248,656 | 4/1966 | Caswell | 307—88 X |
| 3,015,778 | 1/1962 | Bruijning | 328—67 |
| 3,149,245 | 9/1964 | Barnes et al. | 307—106 |
| 2,137,401 | 11/1938 | Hobbie | 328—67 X |

OTHER REFERENCES

IBM Technical Disclosure Bulletin, vol. 2, No. 4, p. 88, December 1959 (Bittetto & Stamm).

Millman and Taub, "Pulse and Digital Circuits," 1956, pp. 40–41.

MILTON O. HIRSHFIELD, *Primary Examiner.*

D. F. DUGGAN, *Assistant Examiner.*